United States Patent [19]
Shea

[11] 3,817,102
[45] June 18, 1974

[54] COMBINED TEMPERATURE-HUMIDITY INDEX COMPUTATION KIT

[75] Inventor: Gerald A. Shea, Middeltown, Md.

[73] Assignee: The United States of America as represented by the Secretary of the Army, Washington, D.C.

[22] Filed: Oct. 26, 1972

[21] Appl. No.: 300,932

[52] U.S. Cl. ................................................. 73/338
[51] Int. Cl. ............................................. G01w 1/06
[58] Field of Search .......... 73/338, 336, 355, 343 R

[56] References Cited
UNITED STATES PATENTS
2,681,572  6/1954  Lamb .................................. 73/338
3,531,991  10/1970  Strong et al. ..................... 73/355 R Primary Examiner—Donald O. Woodiel
Attorney, Agent, or Firm—James E. Noble; William G. Gapcynski; Lawrence A. Neureither

[57] ABSTRACT

Wet bulb, dry bulb and black globe analog thermometers are mounted in parallel on shock-proof support bars within a hinged-top box. The support bars are themselves mounted on hinges so that the thermometer assembly can be partially rotated out of the box to a position above the top of the box. The handle used to rotate the assembly out of the box also serves to shield the dry bulb thermometer from incident radiant energy. A special purpose slide rule is attached to the inside top of the box for the purpose of computing a combined temperature-humidity index based on readings taken from the three thermometers.

11 Claims, 6 Drawing Figures

3,817,102
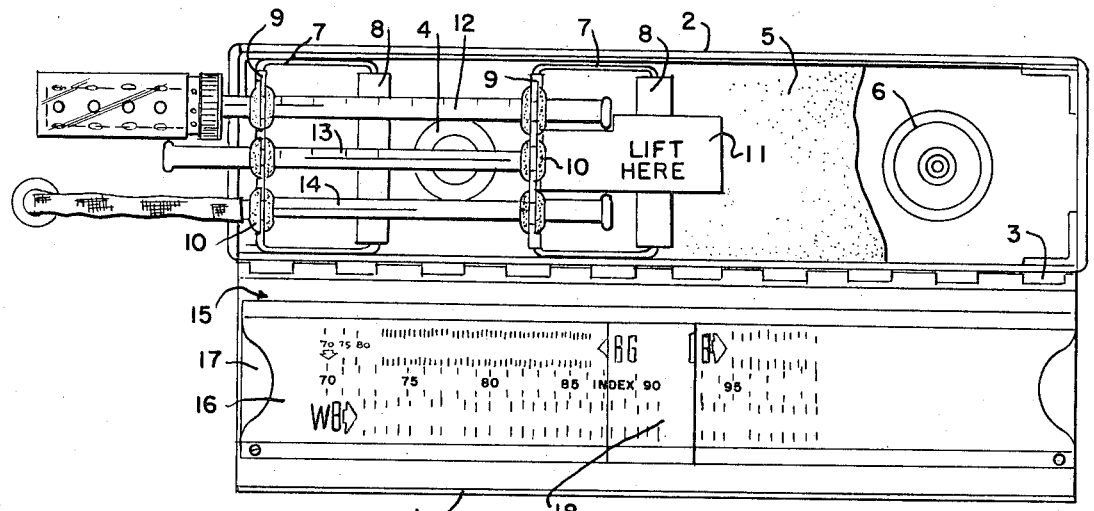
FIG. 1
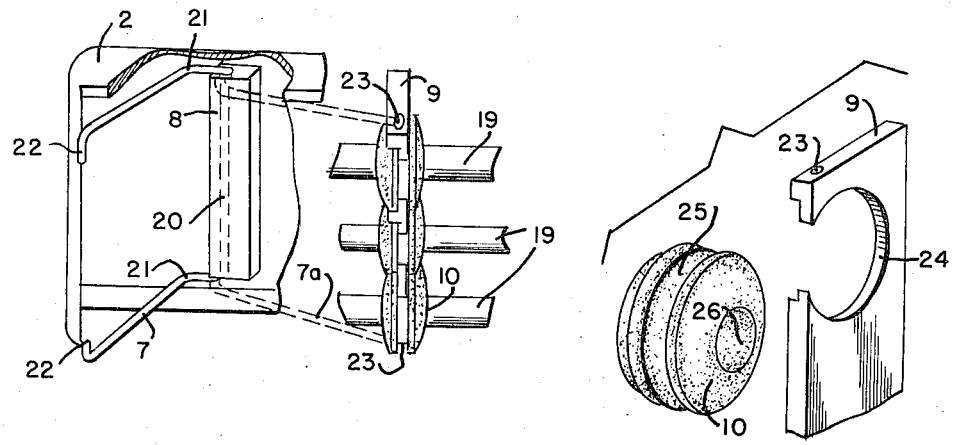
FIG. 2
FIG. 3

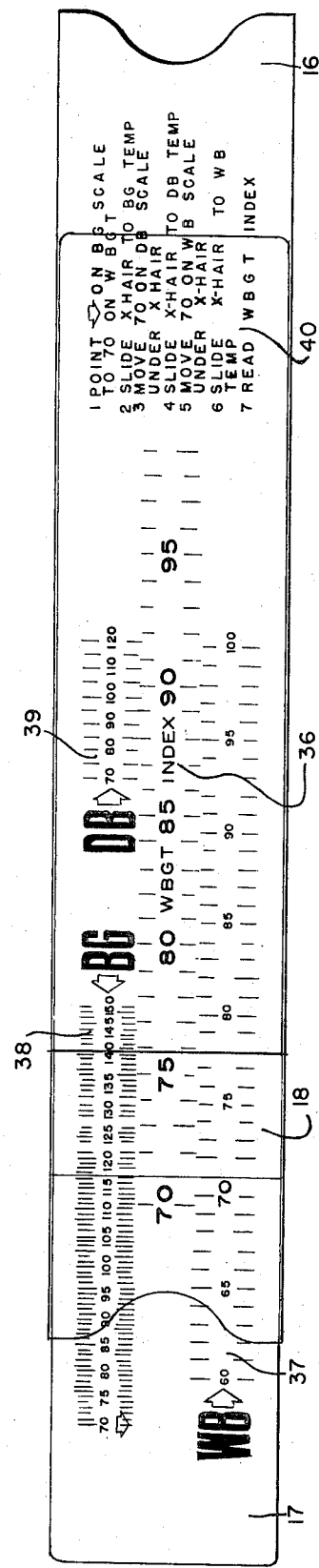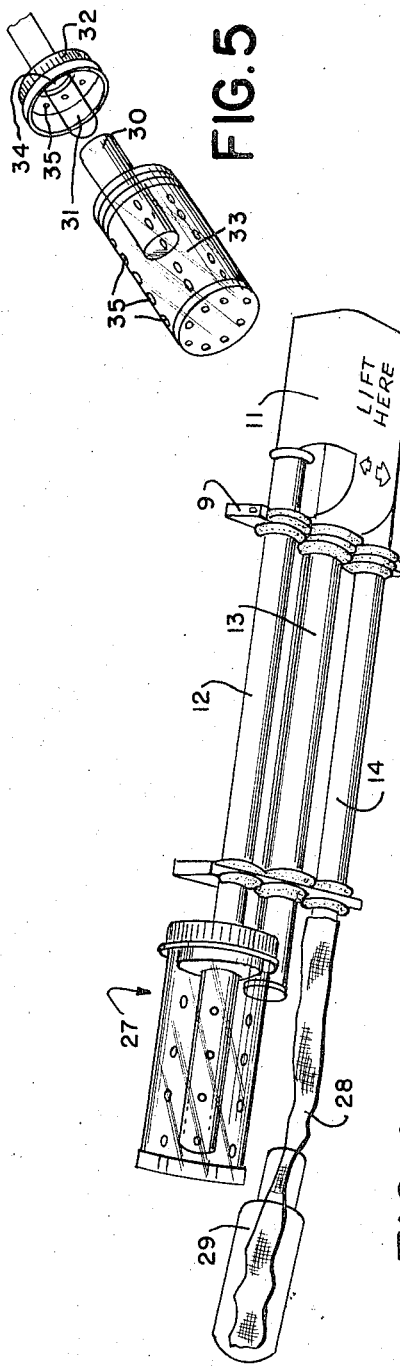

COMBINED TEMPERATURE-HUMIDITY INDEX COMPUTATION KIT

The invention described herein may be manufactured and used by or for the Government for governmental purposes without the payment to me of any royalty thereon.

BACKGROUND OF THE INVENTION

1. Field of the Invention

This invention is in the field of devices that measure the potential health risk to persons engaged in physical activity in a hot environment. Specifically, it is directed to the computation of the so-called Wet Bulb Globe Temperature Index (WBGT Index). This Index, which is a function of three different thermometer readings, is computed according to the formula:

WBGT Index = 0.7(WBT) + 0.2(BGT) + 0.1(DBT)

where

WBT = temperature indicated on a wet bulb thermometer.

BGT = temperature indicated on a black globe thermometer.

DBT = temperature indicated on a dry bulb thermometer.

Where all temperatures are measured in degrees Fahrenheit.

The WBGT Index has been found to be an accurate measure of the health risk to persons undergoing physical training in a hot environment. More particularly, the Index has been used in the following manner:

80 < WBGT Index < 85: Discretion used in planning heavy exercise for unseasoned personnel.

WBGT Index = 85: Strenuous exercise in unseasoned personnel suspended. Reduced training activities after the second week of training.

85 < WBGT Index < 88: Outdoor classes in the sun avoided.

WBGT Index ≥ 88: All physical training halted. Limited exposure to seasoned personnel.

2. Description of the Prior Art

Various devices have been built for the purpose of computing relative humidity. These devices usually employ wet and dry bulb thermometers and means for computing the relative humidity. A typical example of such a device is found in U.S. Pat. No. 2,681,572. In addition, this device has a built in slide rule for calculating the relative humidity from the two thermometer readings. It is also well-known that a thermometer which is painted black is more sensitive to changes in incident radiation than the normal transparent one. See, for example, U.S. Pat. No. 383,691.

The above-mentioned devices are directed only to the moisture content of the air or the temperature and do not indicate the combined effect of moisture and temperature. The WBGT Index is one way of reflecting both temperature and humidity effects in a single index.

A typical WBGT Index kit employs three different thermometers whose readings are integrated into one composite WBGT Index. One thermometer is a standard wet bulb thermometer. Another is a standard dry bulb thermometer whose sensor end is shielded from incident radiant energy. The third thermometer used is a black globe thermometer where the sensor end of a standard thermometer is covered with a black copper globe.

Previous kits built for the purpose of computing a WBGT Index have been unsatisfactory because of weight, size and the requirement of pencil and paper calculation of the Index itself. For example, one of the earlier kits weighed 21 pounds, occupied 1.45 cubic feet of space in the compacted state and required pencil and paper solution of the WBGT Index formula. In addition, it required the assembly of several parts to produce the field device and was quite unwieldy. An improvement on the device consisted of automatic electronic calculation of the WBGT Index. The electronic WBGT Index kit weighed 11 pounds, occupied 0.63 cubic feet of space and automatically point out the WBGT Index on a scale. However, it too was unwieldy in the assembled state and was not accurate.

The main reason for the unwieldy size of the previous WBGT Index kits was the structure of the black globe thermometer. In order to accurately gauge the contribution of incident radiant energy to the overall Index, it was necessary to inclose the sensor end of the thermometer in a 6 inch diameter black copper sphere. Thus any attempt at increased compactness must begin with a new design of the black globe thermometer.

SUMMARY OF THE INVENTION

The invention solves the aforementioned problems by providing a wet bulb globe temperature index kit that weighs 0.7 pounds, occupies 0.025 cubic feet of space when compacted and has a specially designed slide rule for the speedy computation of the WBGT Index. This is accomplished in part by a new design of the black globe thermometer. The 6 inch black globe of the prior art has been replaced by an analog device consisting of a black copper sheath 1 7/16 inches long that fits snugly over the sensor end of the thermometer and a transparent perforated cylindrical air shield 2⅛ inches long and ¾ inch in diameter that fits over the sheath. An accurate approximation of black globe characteristics is obtained by drilling a total of 56 one-sixteenth inch diameter holes in the air shield. These are placed in the following manner: eight around the periphery of each end and forty evenly distributed over the curved surface of the cylinder. Experimentation has shown that the above analog device maintains 6 inch black globe temperature equivalency to a very close degree of approximation. In addition, the analog device reaches a state of equilibrium much faster than the black globe thereby reducing the stabilization time.

Further, compactness has been attained by placing the three thermometers side-by-side in a hinged shock-proof mount within a box measuring 10 inches × 2½ inches × 1¾ inches. The mount consists of support bars to which are affixed hinges and shock absorbing cushions. The thermometers are inserted through the cushions so as to rest upon the support bars in a shock-proof assembly. When the device is in use, the assembly is partially rotated out of the box so that air can freely circulate around the thermometers. When not in use, the entire assembly rests upon a bed of foam-like material which is attached to the floor of the box. Additional compactness is obtained by attaching the specially designed slide rule to the inside top of the box. Simplicity is maintained by providing a dual purpose handle-shield which is used to rotate the mount out of the box and also to shield the sensor end of the dry bulb thermometer from incident radiant energy.

A specially designed slide rule is provided for the solution of the WBGT Index formula. It consists of a stationary transparent member containing the WBGT Index scale and a sliding member with wet bulb, dry bulb and black globe temperature scales printed on it. A sliding cross hair is also provided. The four scales are all linear, but the three scales corresponding to the components of the WBGT INdex have been compressed relative to the WBGT Index scale to reflect the influence of the three different weighing factors in the formula.

Accordingly, it is an object of this invention to provide a rugged, compact and portable device for the speedy and accurate calculation of an index which measures the hot environment health risk to persons engaged in physical activity.

Another object of this invention is to provide a device that can be used by either mounting it on a tripod or handheld.

It is a further object of this invention to provide a device whose stabilization time is less than the prior art.

Still another object of the invention is to provide a compact deivce that can be readily employed in a confined space such as the interior of a vehicle.

Yet another object of the invention is to provide a device that employs a special slide rule for the rapid and accurate computation of said index.

These and other objects, advantages and novel features of the invention will become apparent from the following detailed description of the invention when considered in conjunction with the following drawings.

BRIEF DESCRIPTION OF THE DRAWINGS

FIG. 1 is a plan view of the top of the opened WBGT Index kit with the thermometer assembly rotated to its working position.

FIG. 2 is an isolated perspective view of a support bar and a hinge showing the hinge in two different positions.

FIG. 3 shows an isolated view of how the shock absorbing cushions are affixed to a support bar.

FIG. 4 is a perspective view of the thermometer assembly.

FIG. 5 is a detailed perspective view of the black globe analog.

FIG. 6 is a plan view of the special slide rule.

DESCRIPTION OF THE PREFERRED EMBODIMENTS

Referring to the drawings, in particular FIG. 1, the top of the container 1 is attached to the lower part 2 by a hinge 3. When the top is closed, the enitre WBGT Index kit is packed into a container measuring approximately 10 inches in length, 2½ inches in width and 1¾ inches in depth. A threaded attachment 4 is provided on the bottom outer-side of the container so that the container may be connected to a tripod if desired. The bottom inner-side of the container is covered with a foam-like cushion 5 which can be polyurethane ester or any other cushioning material. The cushion serves to protect the contents of the kit from shock when the kit is not being used. An extra wick 6 for the wet bulb thermometer is also attached to the bottom inner-side of the container. The hinges 7 are made from small diameter metal rods and are connected at one end to the bottom of the container by channeled cross bars 8. At the other end they are connected to the support bars 9. Attached to each support bar are shock absorbing cushions 10 which in the preferred embodiment are made from rubber but can be fabricated from any resilient material. A combination handle-shield is shown as item 11 which is more particularly described with reference to FIG. 5. The black globe theremometer 12, dry bulb thermometer 13 and wet bulb thermometer 14 are inserted through the cushions 10 and rest in parallel on the support bars 9. Thus, when the three thermometers are mounted on the support bars, a rigid member is created which will be designated the thermometer assembly. The slide rule 15 is attached to the top of the container as shown in FIG. 1. The stationary base 16 of the slide rule is made from a transparent material such as Plexiglas and is attached to the inside top of the container. A slide 17 fits into the stationary base and can slide back and forth within it. A transparent cursor 18 is affixed to the stationary base and can slide along it.

In FIG. 2, the hinge 7 is shown in the upright position (which corresponds to the thermometer assembly sitting above the container) and at 7a as it would look partway between the upright position and its reclined position. The hinge 7a (shown as dotted lines) is attached to the support bar 9 upon which the thermometers 19 have been mounted by inserting them through the shock absorbing cushions 10. The bottom of the hinge 20 (shown as dotted lines) passes through the channeled cross bar 8 which is attached to the floor of the container. This anchors the hinge at one end to the container floor and also serves as its axis of rotation. The hinge is bent at 21 in a plane perpendicular to its axis of rotation so that when rotated the hinge is halted at its upright position by the combined action of the bottom of the bend and the channeled cross bar. The top of the hinge is bent in a plane parallel to its axis of rotation so as to produce two wmall arms 22 that fit into holes 23 in the support bar.

A close-up view of how the shock absorbing cushions 10 are attached to the support bars 9 is shown in FIG. 3. A notch 24 is cut into the support bar so that it can receive another notch 25 that has been made around the circular rubber cushion. The cushion is force-fit into the notch in the support bar and has a hole 26 cut into it that is large enough to receive the body of one of the thermometers. Although the drawing shows a notch in the support bar of less width than the support bar itself, this is an arbitrary choice and the width of the notch 24 only depends on the width of the notch 25.

Referring, now, to FIG. 4, the thermometer assembly is isolated to show the black globe analog 27 mounted on its thermometer 12, the wick 28 used to cover the sensor end of the wet bulb thermometer 14, and the water reservoir 29 used to supply the wick with water. The handle 11 is used to lift the thermometer assembly out, partially to the left, and above of the container into its upright position. The handle 11 is painted glossy white and shields the sensor end of the dry bulb thermometer 13 from incident radiation. Handle 11 is attached to the support bar 9 as shown and is shaped so that the portion above the printed words "LIFT HERE" is curved over and extends below the thermometer 13 with an air space between the shield and the sensor end.

In FIG. 5, the details of the black globe analog 27 are shown. A black copper sheath 30 with one end closed fits snugly over the sensor end 31 of the thermometer 12. The black copper sheath is analogous to the well-known "black body" optimum radiation absorbing device. A transparent air shield consisting of a cap 32 that snaps onto a cylindrical body 33 fits over the sheath and sensor by means of the holw 34 that is drilled in the cap. Although the preferred embodiment shows the air shield made up of two parts, it is clear that the air shield could easily be made as a single unit. Air holes 35 are drilled into the cylindrical surface and each end of the air shield. The air shield prevents the entrance of unrestricted air flow into the interior of the analog while still allowing some air to get in through the air holes. As discussed in the Summary of the Invention, an accurate analog to the black globe has been found to be one using an air shield with 56 one-sixteenth inch diameter air holes. In the preferred embodiment, the air shield has eight holes on each end and 40 evenly distributed over the curved surface of the cylinder. This is not meant to limit the invention since it is entirely possible that other combinations of hole diameter, distribution, and number of holes could produce an equally accurate analog device.

In the WBGT Index formula, each of the components (i.e. temperatures) of the WBGT Index is multiplied by a weighing factor in order to correctly determine its contribution to the overall index. For example, the wet bulb temperature (WBT) is mulitplied by 0.7, the black globe temperature (BGT) by 0.2, and the dry bulb temperature (DBT) by 0.1. These reduced values must then be added together to produce the WBGT Index. It is clear that the solution of the WBGT Index formula can be performed by the addition of three linear scales corresponding to the three measured temperatures, provided that each scale automatically takes into account the influence of its particular weighing factor. This has been accomplished by a linear compression of the length of each temperature scale relative to the length of the WBGT Index scale, the amount of compression depending on the particular weighing factor.

FIG. 6 is a detailed view of the special slide rule used to solve the WBGT Index formula. The WBGT Index scale 36 is impressed upon the middle of the upper face of the transparent base 16. Its range of values, 70 to 100, is adequate to measure any WBGT Index of significance. The WBT scale 37 is printed upon the bottom of the top face of the slide 17 and ranges in value from 60 to 100. The WBT scale has been compressed relative to the WBGT Index scale so that when the two scales are lined up, any incremental change on the WBT scale will have a corresponding incremental change on the WBGT Index scale that is 0.7 of the WBT incremental change, This has been accomplished by building the WBT scale so that for an increment of 10 on the WBT scale, there is a corresponding increment of 7 on the WBGT Index scale.

The BGT scale 38 is printed on the upper left side of the top face of the slide 17 and ranges in value from 70 to 150. It, too, is compressed so as to automatically multiply a BGT temperature value by 0.2. The scale has been made so that for an increment of 5 on the BGT scale there is a corresponding increment of 1 on the WBGT Index scale.

FInally, the DBT scale 39 is located on the upper right side of the top face of the slide 17 and increases in value from 70 to 120. Its weighing factor of 0.1 is taken into account by constructing the DBT scale so that for an increment of 10 on the DBT scale there is corresponding increment of 1 on the WBGT Index scale.

Notice that the WBT scale starts at 60 and the other three scales all begin at 70. This is done in the interest of compactness and also recognizes the insignificance of any WBGT Index value less than 70. The above scale construction is based on the following derivation:

$$\text{WBGT Index} = 0.7(\text{WBT}) + 0.2(\text{BGT}) + 0.1(\text{DBT})$$

$$\text{WBGT Index} - K = (0.7\text{WBT} + 0.2\text{BGT} + 0.1\text{DBT}) - K \text{ or}$$

$$\text{WBGT Index} = K = [0.7(\text{WBT} - K) + 0.2(\text{BGT} - K) + 0.1(\text{DBT} - K)]$$

where $70 \leq K \leq 100$

The last equation is normally implemented by starting all WBGT Index calculations from the 70 value (i.e $K = 70$) on the WBGT Index scale and subtracting 70 from all temperature values by incrementally adding the temperature values from the 70 position on their scales.

Of course values of WBGT Index greater than 70 could also be used as the basis for making the WBGT Index calculation.

Instructions 40 for using the slide rule to solve the WBGT Index formula are conveniently located on the upper face of the base as shown in FIG. 6.

DETERMINATION OF A WBGT INDEX

The top of the container is opened and the handle 11 is used to pull the thermometer assembly out, partially to the left, and above the container into its upright position. Next, the wick on the wet bulb thermometer is wetted. The thermometers are now exposed to the environment to be tested and after a short time will be in equilibrium with the environment and their readings can be used. The thermometer readings are used to compute the WBGT Index in the following manner. First, the WBGT Index scale and the BGT scale are aligned on a common value (for example, 70). Next the cursor is moved to the BGT value on the BGT scale. Now the 70 on the DBT scale is aligned with the cursor and the cursor is then moved to the DBT value on the DBT scale. Finally, the 70 on the WBT scale is aligned with the cursor and the cursor moved to the WBT value on the WBT scale. The WBGT Index is not read from the intersection of the cursor and the WBGT INdex scale. It is obvious that the order of addition is immaterial so that the previous calculation could have been performed in any desired order of temperature scales.

I claim:
1. A device for determining a combined temperature-humidity index, comprising:
   a. a container;
   b. a wet bulb thermometer;
   c. a first dry bulb thermometer;
   d. a second dry bulb thermometer;
   e. black globe, radiation absorption, analog means attached to the sensor end or said second dry bulb thermometer;
   f. hinged means attached to said container for mounting said thermometers within said container whereby said thermometers may be rotated from within said container to positions that expose the sensor ends of said thermometers to the environment; and g. a shield attached to said hinged means for mounting said thermometers so that said shield does not touch said first dry bulb thermometer and shields the sensor end of said first dry bulb thermometer from incident radiant energy.

2. A device as recited in claim 1, wherein said black globe, radiation absorption, analog means comprises:

a. a black first tube with one end closed and of slightly larger diameter than the sensor end of said second dry bulb thermometer, so that said tube fits over and covers the sensor end of said second dry bulb thermometer; and b. a transparent second tube with both ends closed, of larger diameter and length than said first tube and having a plurality of holes through the surface thereof with at least one of said holes being of sufficient size to allow said second tube to fit over and completely envelope said black first tube.

3. A device as recited in claim 2, wherein said hinged means for mounting said thermometers comprises:

at least two parallel members, each of said parallel members having adjacent apertures, said apertures in each of said parallel members being relatively longitudinally aligned;

b. a resilient member having a passage therethrough lining each of said apertures, the axes of said passages and said apertures being coincident;

c. said thermometers selectively projecting through said passages in adjacent parallel relation; and d. tandem mounting means connected to said parallel members and fixedly secured to said container whereby said parallel members carrying said thermometers may be rotated from within said container to positions parallel to said container.

4. A device as recited in claim 3 wherein said tandem mounting means comprises arms connected at one end thereof to opposite ends of each of said parallel members and at an opposite end thereof to corresponding base members fixedly secured in said container.

5. A method for determining a combined temperature-humidity index, comprising:

a. exposing a wet bulb thermometer, a first dry bult thermometer having the sensor end shielded from incident radiant energy and a second dry bulb thermometer having black glove, radiation absorption, analog means covering the sensor end thereof to the environment to be tested;

b. waiting a sufficient time to allow said thermometers to reach a state of equilibrium with said environment;

c. providing a calculator comprising a fixed and a movable member with a cursor attached to the fixed member, said calculator having on said movable member a first scale of values corresponding to temperatures read from said wet bulb thermometer, a second scale of values corresponding to temperatures read from said first dry bulb thermometer, and a third scale of values corresponding to temperatures read from said second dry bulb thermometer, said calculator also having on said fixed member a fourth scale of values corresponding to values of a temperature-humidity index;

d. aligning said third scale with said fourth scale so that a value on one scale is aligned with a common value on the other scale, reading the value indicated on said second dry bulb thermometer, and moving said cursor to a value on said third scale that corresponds to the value read from said second dry bulb thermometer;

e. sliding said movable member so that a value on said second scale equal to said common value is aligned with said cursor, reading the value indicated on said first dry bulb thermometer, and moving said cursor to a value on said second scale that corresponds to the value read from said first dry bulb thermometer;

f. sliding said movable member so that a value on said first scale equal to said common value is aligned with said cursor, reading the value indicated on said wet bulb thermometer, and moving said cursor to a value on said first scale that corresponds to the value read from said wet bulb thermometer; and g. reading said temperature-humidity index from the value indicated on said fourth scale by said cursor.

6. A device as recited in claim 1, which further comprises:

a. a cover connected to said container; and b. slide rule means for calculating said combined temperature humidity index attached to said cover whereby readings taken from said thermometers are correlated to produce said combined temperature humidity index.

7. A device as recited in claim 4, which further comprises:

a. a cover connected to said container; and b. slide rule means for calculating said combined temperature humidity index attached to said cover whereby readings taken from said thermometers are correlated to produce said combined temperature humidity index.

8. A device for determining a combined temperature-humidity index, comprising:

a. a wet bulb thermometer;

b. a first dry bulb thermometer;

c. a second dry bulb thermometer;

d. black globe, radiation absorption, analog means attached to the sensor end of said second dry bulb thermometer;

e. means for maintaining said thermometers mutually spaced so that said thermometers are exposed to the same environmental conditions; and f. a shield attached to said means for maintaining said thermometers mutually spaced so that said shield does not touch said first dry bulb thermometer and shields the sensor end of said first dry bulb thermometer from incident radiant energy.

9. A device as recited in claim 8 wherein said thermometers are connected and secured in a mutually spaced, adjacent, parallel relation.

10. Radiation absorption apparatus for use in combination with a dry bult thermometer having a sensor end for measuring environmental temperatures comprising:

a. a black first tube with one end closed and of slightly larger diameter than the sensor end of a dry bulb thermometer, so that said black first tube fits over and covers the sensor end; and b. a transparent second tube with both ends closed, of larger diameter and length than said first tube and having a plurality of holes through the surface thereof with at least one of said holes being of sufficient size to allow said second tube to fit over and completely envelope said black first tube.

11. Radiation absorption apparatus as recited in claim 10 wherein:
 a. said black first tube further comprises a black copper sheath adapted to fit anugly over the sensor end; and
 b. said transparent second tube further comprises:
  i. a body portion with one end closed; and
  ii. a cap portion which is adapted to snap onto the open end of said body portion and having a center hole to allow said cap portion to slide onto a dry bulb thermometer.

* * * * *